United States Patent [19]

Mivelaz

[11] Patent Number: 4,846,403

[45] Date of Patent: Jul. 11, 1989

[54] WATERING SYSTEM AUTOMATIC ADDITIVE DISPENSER

[76] Inventor: Michael B. Mivelaz, P.O. Box 2085, Stockton, Calif. 95201-2085

[21] Appl. No.: 211,455

[22] Filed: Jun. 24, 1988

[51] Int. Cl.⁴ ............................................. B05B 7/28
[52] U.S. Cl. ................................... 239/201; 239/309; 239/310; 239/317; 137/71; 137/218; 141/330; 222/82
[58] Field of Search ............... 239/201, 272, 309, 310, 239/317, 570; 137/71, 218; 222/80, 81, 82, 83, 83.5, 129.2, 145; 141/330

[56] References Cited

U.S. PATENT DOCUMENTS

| | | | |
|---|---|---|---|
| 3,026,047 | 1/1959 | Fowler | 239/309 |
| 3,180,352 | 4/1965 | Kersten et al. | 137/218 |
| 3,383,044 | 5/1968 | Norstrud et al. | 239/310 |
| 3,416,556 | 12/1968 | Nelson | 137/218 |
| 3,638,833 | 2/1972 | Lucas | 222/57 |
| 3,833,177 | 9/1974 | Pasley et al. | 239/201 |
| 4,081,006 | 3/1978 | Crowell et al. | 222/83.5 |
| 4,572,235 | 2/1986 | Katzer et al. | 137/268 |
| 4,635,848 | 1/1987 | Little | 239/10 |

Primary Examiner—Andres Kashnikow
Assistant Examiner—Karen B. Merritt
Attorney, Agent, or Firm—Walter A. Hackler

[57] ABSTRACT

An automatic additive dispenser and system includes a container adapted to be releasably attached to a housing and having a rupturable seal along with means for rupturing the seal and enabling additive to enter a flow of water through the housing, in response to initial water flow through the housing. Additives contained in the bottle are prevented from entering the system before the seal is ruptured, thus enabling pre-disposition of the bottle in the system for later dispersement of additive without premature leakage of the additives into the system.

12 Claims, 2 Drawing Sheets

WATERING SYSTEM AUTOMATIC ADDITIVE DISPENSER

The present invention generally relates to apparatus for providing additives, such as fertilizers and pesticides, to standard irrigation systems. More particularly, the present invention relates to an automatic additive dispenser system and kit for converting an anti-syphon valve into an automatic additive dispenser system.

Conventional lawn irrigation systems have been in use for many years. Conventional systems typically include a plurality of sprinkler-type heads interconnected by underground plastic piping, which is coupled to a water supply through a conventional anti-syphon valve, such as a Richdel-type or Champion-type anti-syphon valve as is well known in the art, to prevent backflow into the water supply from the underground piping system due to syphoning thereof.

Many efforts have been made to utilize the water dispersibility of an underground irrigation system for the dissemination of fertilizers and pesticides. Some of these systems have utilized separate apparatus disposed in a spaced apart relationship with an antisyphon valve assembly for introducing additives into the irrigation system.

An example of this is U.S. Pat. No. 3,833,177 to Pasley et al, entitled, "Fluid Disseminating Device". This patent discloses a bottle interconnected with a coupling system for providing fluid communication between the bottle and the underground sprinkling system.

While this system may effectively introduce a fertilizer/pesticide into the irrigation system, it has a number of disadvantages. First, fluid communication between the bottle and the irrigation system must be manually established by the turning of the valve or the like. This is inconvenient for many irrigation systems, particularly large scale irrigation systems for golf courses and the like, which are controlled by automatic timers. To ensure proper fertilization, bottles must be installed just prior to the initiation of irrigation or the fertilizer may prematurely disperse itself in the underground pipes in undesirable non-uniform fashion, resulting in a large amount of fertilizer being disseminated by the sprinkler system when it is turned on instead of gradually being released thereinto as irrigation continues, which is the object of such systems.

Other systems utilize the anti-syphon valve as the entry point for the introduction of liquid additives into an underground irrigation system. An example of this type of system is disclosed in U.S. Pat. No. 4,635,848 to Little, entitled: "Irrigation Additive Delivery System". This system utilizes the Venturi effect to permit control delivery of additive to outgoing irrigation water as it passes through the anti-syphon valve.

The anti-syphon valve is modified by a housing insert which enables interconnection of the anti-syphon valve to a separate container for holding a supply of fertilizer, pesticide, herbicide and/or fungicides.

This patent also discloses the use of pressure activated check valves to prevent back mixing as well as to shut off individual circuits from the additive system when another circuit is in use. This pressure relief valve is disposed in the line between the container of additive and the anti-syphon valve. While this system may be effective in delivering liquid additives to more than one sprinkling circuit, it is rather complex and includes a number of check valves which are subject to clogging and thereby preventing a long term maintenance free operation of the system.

The present invention provides for an automatic additive dispenser system which is simple, efficient and trouble free. It is suitable for use with automatic timed irrigation systems and does not disrupt or interfere with the irrigation system when it is not in use. Further, fertilizers, pesticides, fungicides and the like, can be predisposed for later use, as in a timed irrigation system, without the possibility of leakage system before operation of the system.

SUMMARY OF THE INVENTION

An automatic additive dispenser system for a watering system, in accordance with the present invention, generally includes a housing having a water inlet and a water outlet, means for releasably attaching a container with additive therein to the housing and means for rupturing a rupturable seal in the container, thereby enabling additive to enter a flow of water through the housing, in response to a flow of water through the housing.

More particularly, the automatic additive dispenser includes valve means disposed in the housing for controlling the flow of water therethrough and the means for rupturing the rupturable seal and enabling additive to enter a flow of water is operative for rupturing the rupturable seal upon initial flow of water through the housing. This feature enables the installation of the container onto the housing while maintaining the integrity of the container. That is, the sealed container is attached to the housing and access to the additives therein does not occur until the rupturable seal of the container is pierced due to the initial flow of water through the housing. Hence, the container can be in position on the housing indefinitely without premature leakage or dispensing of additives into the housing before water is flowing therethrough.

Thus, the present invention is particularly adapted to those irrigation systems which are automatically controlled with timing devices. Hence, the container may be installed and relied upon to maintain a full charge of additive until water is dispensed through the housing, with such initial flow of water occurring at a preselected later time.

In addition, the automatic additive dispenser system may include anti-syphon means for preventing a backflow of water through the housing from a water outlet through the water inlet and wherein the means for rupturing the rupturable seal and enabling additive to enter a flow of water further comprises means for sealing off the anti-syphon means when the water is flowing through the housing from the water inlet to the water outlet.

also, in accordance with the present invention, an automatic additive dispenser kit may be provided for converting an anti-syphon valve into an automatic additive dispenser system. The kit comprises a cap adapted for replacing an existing cap of an anti-syphon valve with the cap including means for releasably attaching a container thereto, said container having an additive therein and a rupturable seal. In addition, means for rupturing the rupturable seal when the container is attached to the cap and enabling additive to enter a flow of water through the anti-syphon valve is provided.

In another embodiment, an automatic additive dispenser system, in accordance with the present invention, includes a housing having a water inlet and a water outlet, and engagement means for releasably attaching a container with additive therein to the housing, said container having a rupturable seal. Flow valve means are provided for rupturing the rupturable seal and for enabling additive to enter a flow of water through the housing from the water inlet to the water outlet in response to said flow of water through the housing and at least one watering dispensing fixture interconnected with the housing water outlet.

In order to provide sequential and continuous use of this system, a plurality of interchangeable containers with additive therein and having rupturable seals may be provided.

BRIEF DESCRIPTION OF THE DRAWINGS

The advantages and features of the present invention will appear from the following description, considered in conjunction with the accompanying drawings, in which.

DETAILED DESCRIPTION

Figure 1:
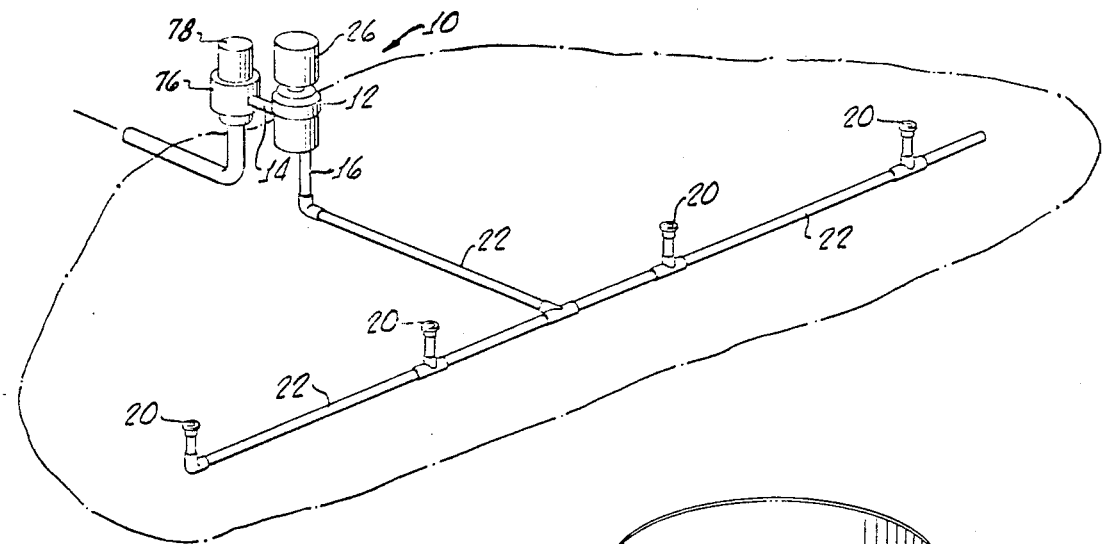
FIG. 1 is a perspective view of an automatic additive dispenser system, in accordance with the present invention, including a plurality of water-dispensing fixtures.

Turning now to FIG. 1, there is shown an automatic additive dispenser system 10 generally including a housing 12, having a water inlet 14 and a water outlet 16, along with a plurality of sprinklers 20 for dispensing water in a conventional manner which are interconnected with the water outlet 16 by means of conduits 22 which may be of conventional PVC construction. As shown in FIG. 1, the present invention is most suitable for underground sprinkling systems wherein the housing 12 and fixtures 20 are disposed above ground and the conduits 22 are subterraneanly disposed. As hereinafter described in greater detail, a container 26 is releasably attached to the housing 12.

Figure 2:
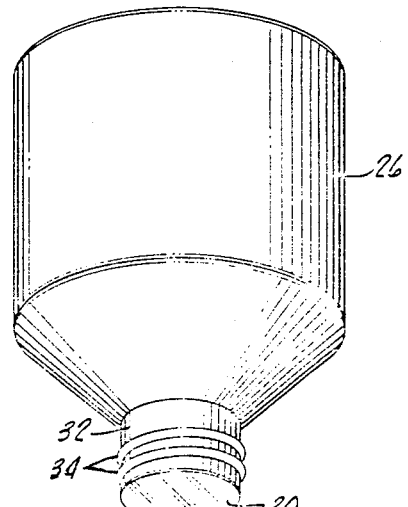
FIG. 2 is a perspective view showing a container and a housing, in accordance with the present invention, with said container including means for releasably attaching it to the housing and having a rupturable seal.
Figure 2:
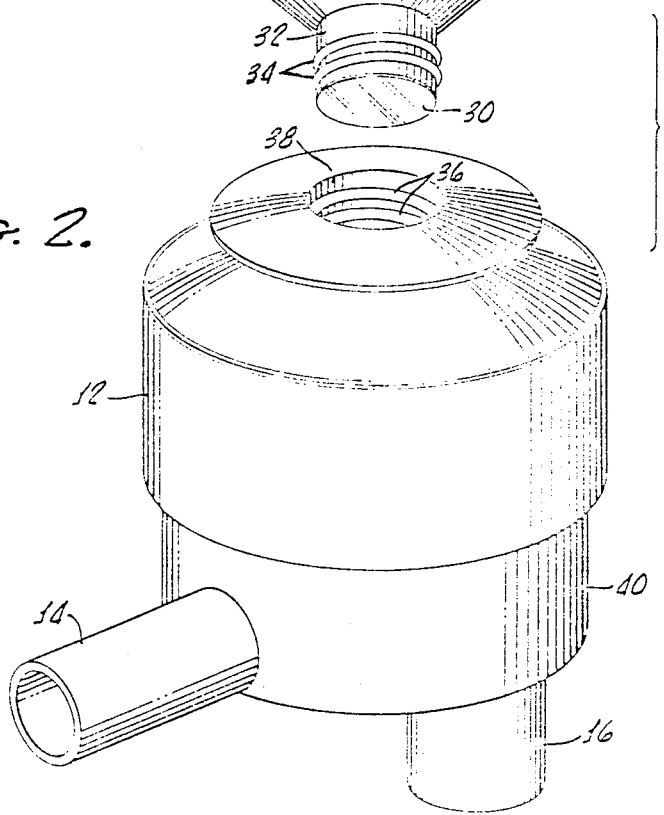

Importantly, as shown in FIG. 2, the container 26 includes a rupturable seal 30 and a neck 32 including threads 34 which provides a means for releasably attaching the container 26 to the housing 12 which may have mating threads 36 in an opening 38 therein.

It should be appreciated that any conventional disconnect system such as a bayonet attachment configuration, not shown, may be utilized to attach the container 26 to the housing 12.

It should also be appreciated that while in one embodiment of the present invention, the housing 12, may comprise an entire anti-syphon valve type apparatus, yet in another embodiment of the present invention, the housing 12 may comprise a cap which is adapted for replacing the existing cap, not shown, of an anti-syphon valve 40, see FIG. 2. In this manner, the invention may be used to upgrade existing irrigation systems, without the necessity of access to the underground piping 22.

Figure 3:
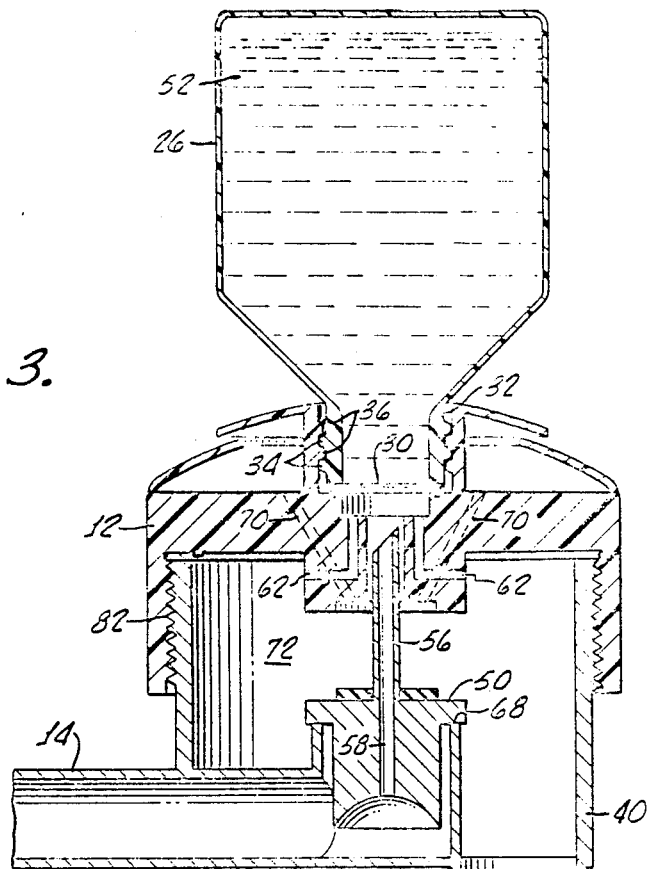
FIG. 3 is a cross-sectional view of the present invention showing the container in a storage position with the rupturable seal intact to enable prepositioning of the container without premature introduction of additives within the container from entering the housing; and, FIG. 4 is a cross-sectional view similar to FIG. 3 showing water flow through the housing, a ruptured seal caused by water flow and the purging of additive from the container into the water flow.
Figure 4:
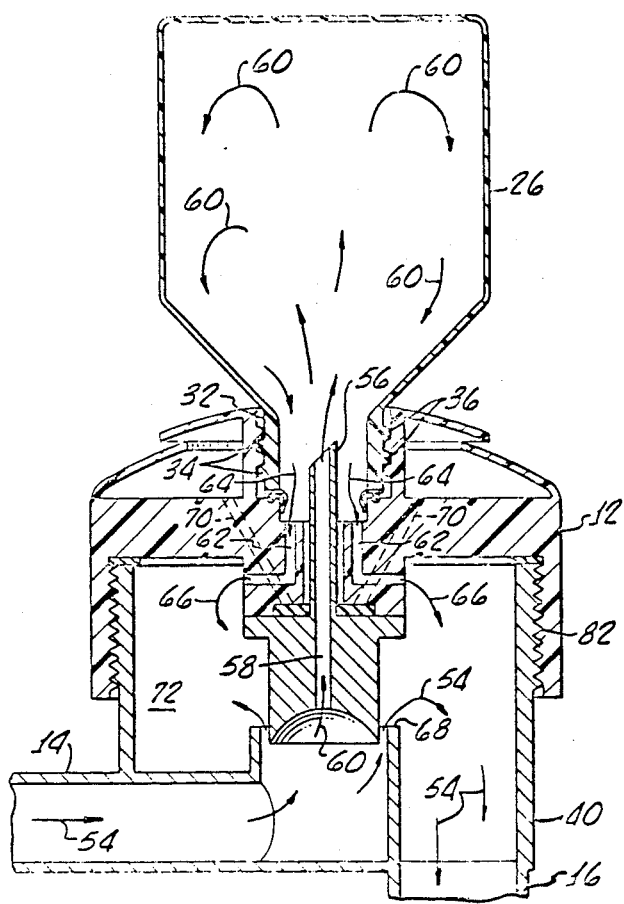

Turning now to FIGS. 3 and 4, there is shown apparatus of the present invention, in cross-section, including a flow valve 50 which provides means for rupturing the rupturable seal 30 and enabling additive 52 to enter a flow of water, indicated by the arrows 54 through the housing in response to the flow of water through the housing 12. FIG. 3 shows the flow of the valve in a down position when water is not flowing through the housing 40 and FIG. 4 shows the flow valve 50 in an up position when water flow occurs through the housing from the inlet 14 to the outlet 16. The flow valve 50 carries a syringe-type needle 56 having an opening 58 therethrough to enable a stream 60 of water to pass therethrough and into the container 26, causing a circulation therein as indicated by the arrows 60 to purge additive 52 downwardly through ports 62 as indicated by the arrows 64 and into the main stream of water flow as indicated by the arrow 66.

The flow valve 50 is sized for resting in a valve seat 68 when water is not flowing and thereby opening passages 70 for enabling air to enter a bottom chamber 72 to prevent backward water flow from the outlet 16 to the inlet 14 as is well known in the art. Control of water through the housing 12 is provided by a conventional valve 76 which may be actuated by a solenoid 78, which provides means for remotely controlling water flow through the housing 12.

As should be evident from a comparison of FIGS. 3 and 4 when the container 26 is installed on the housing 12, it remains in a sealed condition until water flow occurs forcing the flow valve 50 in an upward direction and the needle through the rupturable seal 30. Thereafter, a flow of water through the opening 58 and into the container 26 forces additive 52 downwardly as indicated by the arrow 64, forcing the rupturable seal out of the way as water and additive flows through the channel 62, thereafter merging with the main water flow 54.

Installation of the cap 12 on existing anti-syphon valves is facilitated by means of sizing the cap 12 to fit existing housings 40 and providing conventional matching threads 82 in the cap 12 for engaging the housing 40.

After all additive is depleted from the container 26, the entire system remains sealed so further timed flow of water through the housing 26 is not disturbed and in practice a plurality of interchangeable containers may be provided with each one having additive 52 of differing amounts or types, i.e., fertilizers, fungicides, etc.

Although there has been described hereinabove a specific automatic additive dispenser system for a watering system, in accordance with the present invention, for the purpose of illustrating the manner in which the invention may be used to advantage, it should be appreciated that the invention is not limited thereto. Accordingly, any and all modifications, variations or equivalent arrangements which may occur to those skilled in the art, should be considered to be within the scope of the invention as defined in the appended claims.

What is claimed is:

1. An automatic additive dispenser system for a watering system comprising:
    container means for holding an additive, said container means having a rupturable seal;
    a housing having a water inlet and a water outlet, said housing having means defining parts therein for enabling flow of additive therethrough when said container is attached to the housing and the rupturable seal is ruptured;

means for releasably attaching the container means with additive therein to said housing; and, means for rupturing said rupturable seal and introducing a stream of water inside said container to force substantially all of the additives therein out of said container and through the housing ports in response to a flow of water through the housing.

2. The automatic additive dispenser system according to claim 1 further comprising valve means disposed in said housing for controlling the flow of water through the housing.

3. The automatic additive dispenser system according to claim 2 wherein the means for rupturing said rupturable seal and introducing a stream of water inside said container to force the additives therein out of said container is operative for rupturing said rupturable seal upon initial flow of water through the housing.

4. The automatic additive dispenser system according to claim 3 wherein said means for rupturing said rupturable seal and introducing a stream of water inside said container for forcing the additive therein out of the container and through the housing includes a hollow needle having a tip adapted for piercing said rupturable seal.

5. The automatic additive dispenser system according to claim 4 further comprising anti-syphon means for preventing a back flow of water through the housing from the water outlet through the water inlet.

6. The automatic additive dispenser system according to claim 5 wherein said means for rupturing said rupturable seal and enabling additive to enter a flow of water comprises means for sealing off said anti-syphon means when water is flowing through the housing from the water inlet to the water outlet.

7. The automatic additive system according to claim 6 further comprising a plurality of interchangeable containers with additive therein and having rupturable seals.

8. An automatic additive dispenser system comprising:

container means for holding an additive, said container means having a rupturable seal;

a housing having a water inlet and a water outlet, said housing having means defining ports therein for enabling flow of additives therethrough when said container is attached to the housing and the rupturable seal is ruptured;

engagement means for releasably attaching the container with additives therein to said housing;

anti-syphon means for preventing a back flow of water through the housing from the water outlet to the water inlet;

flow valve means for sealing said anti-syphon means in response to water flow from said water inlet to said water outlet;

hollow needle means attached to said flow valve means, for rupturing said rupturable seal and introducing a stream of water inside said container to force substantially all of the additives therein out of the container and through the housing ports in response to a flow of water through the housing from the water inlet to the water outlet; and at least one water dispensing fixture interconnected with the housing water outlet.

9. The automatic additive dispenser system according to claim 8 further comprising valve means disposed in said housing for controlling the flow of water therethrough and said water dispensing fixture is interconnected with the housing water outlet in a manner intended for underground installation.

10. The automatic additive dispenser system according to claim 9 wherein the flow valve means and hollow needle means are operable for sealing said anti-syphon means and rupturing said rupturable seal upon initial flow of water through the housing from the water inlet to the water outlet.

11. The automatic additive dispenser system according to claim 10 further comprising control means for activating the valve means disposed in said housing in order to effect timed delayed initial flow of water through the housing to enable the container with additives therein to remain attached to the housing for a preselected period of time without introducing additives thereinto.

12. The automatic additive dispenser system according to claim 11 further comprising a plurality of interchangeable containers with additives therein and each having a rupturable seal.

* * * * *